United States Patent
Sobanski et al.

(10) Patent No.: US 12,173,624 B2
(45) Date of Patent: Dec. 24, 2024

(54) AXIALLY OFFSET VANE ARRAYS IN TURBINE ENGINE BYPASS

(71) Applicant: Raytheon Technologies Corporation, Farmington, CT (US)

(72) Inventors: Jon E. Sobanski, Glastonbury, CT (US); Neil J. Terwilliger, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/199,742

(22) Filed: May 19, 2023

(65) Prior Publication Data
US 2024/0384659 A1    Nov. 21, 2024

(51) Int. Cl.
  *F01D 9/06* (2006.01)
  *F02C 7/141* (2006.01)
  *F02K 3/06* (2006.01)

(52) U.S. Cl.
  CPC .............. *F01D 9/065* (2013.01); *F02C 7/141* (2013.01); *F02K 3/06* (2013.01); *F05D 2240/12* (2013.01); *F05D 2260/213* (2013.01); *F05D 2260/606* (2013.01)

(58) Field of Classification Search
  CPC ... F01D 9/00; F01D 9/02; F01D 9/065; F02K 3/025; F02K 3/04; F02K 3/06; F02K 3/062; F02K 3/065; F02K 3/115; F02C 7/14; F02C 7/141; F02C 7/18
  See application file for complete search history.

(56) References Cited

U.S. PATENT DOCUMENTS

| | | | |
|---|---|---|---|
| 3,266,564 A | 8/1966 | Sabatiuk | |
| 3,604,207 A | 9/1971 | Waidelich | |
| 3,646,760 A | 3/1972 | Waidelich | |
| 6,139,259 A * | 10/2000 | Ho | F04D 29/684 415/208.1 |
| 6,540,478 B2 * | 4/2003 | Fiala | F01D 5/14 415/199.5 |

(Continued)

FOREIGN PATENT DOCUMENTS

| | | | | |
|---|---|---|---|---|
| GB | 2594712 A | * | 11/2021 | ............. F01D 9/041 |
| WO | WO-0238938 A1 | * | 5/2002 | ............. F01D 25/08 |

(Continued)

OTHER PUBLICATIONS

EP Search Report for EP Patent Application No. 24164641.3 dated Sep. 9, 2024.

*Primary Examiner* — Alain Chau
(74) *Attorney, Agent, or Firm* — Getz Balich LLC

(57) ABSTRACT

A turbine engine is provided that includes a bypass flowpath, a plurality of upstream vanes and a plurality of downstream vanes. The bypass flowpath is fluidly coupled with and downstream of a fan section. The bypass flowpath bypasses a turbine engine core. The upstream vanes are arranged circumferentially about an axis in an upstream vane array. Each of the upstream vanes extends radially across the bypass flowpath. The downstream vanes are arranged circumferentially about the axis in a downstream vane array. The downstream vanes are circumferentially interspersed with the upstream vanes. Each of the downstream vanes extends radially across the bypass flowpath. A first of the downstream vanes is axially offset from a first of the upstream vanes along the axis.

16 Claims, 9 Drawing Sheets

(56) References Cited

U.S. PATENT DOCUMENTS

| | | | | |
|---|---|---|---|---|
| 7,118,331 B2* | 10/2006 | Shahpar | .................. | F01D 5/142 |
| | | | | 415/209.1 |
| 8,516,789 B2* | 8/2013 | Kupratis | .................... | F02C 3/13 |
| | | | | 60/791 |
| 9,869,191 B2* | 1/2018 | Gallagher | ............... | F01D 1/023 |
| 9,909,506 B2* | 3/2018 | Kupratis | .................... | F02C 7/08 |
| 10,184,372 B2 | 1/2019 | Shin | | |
| 10,550,764 B2* | 2/2020 | Roberge | .................... | F02C 3/10 |
| 11,280,212 B2* | 3/2022 | Brignole | ................. | F01D 9/041 |
| 2013/0025286 A1* | 1/2013 | Kupratis | ................ | F02K 3/075 |
| | | | | 60/792 |
| 2014/0260180 A1 | 9/2014 | Kupratis | | |
| 2015/0322855 A1* | 11/2015 | Kupratis | .................. | F02C 3/06 |
| | | | | 60/805 |
| 2015/0369134 A1* | 12/2015 | Kupratis | .................. | F02C 3/04 |
| | | | | 60/726 |
| 2016/0290226 A1* | 10/2016 | Roberge | .................... | F02C 7/32 |
| 2016/0356244 A1* | 12/2016 | Kupratis | .................. | F02C 3/04 |
| 2021/0270148 A1 | 9/2021 | Marchaj | | |
| 2022/0307418 A1 | 9/2022 | Hadley | | |
| 2023/0035231 A1 | 2/2023 | Hu | | |
| 2023/0150678 A1 | 5/2023 | Klingels | | |

FOREIGN PATENT DOCUMENTS

| | | | | |
|---|---|---|---|---|
| WO | 02081883 A2 | 10/2002 | | |
| WO | WO-2014174214 A1 * | 10/2014 | ............... | F02K 3/06 |

* cited by examiner

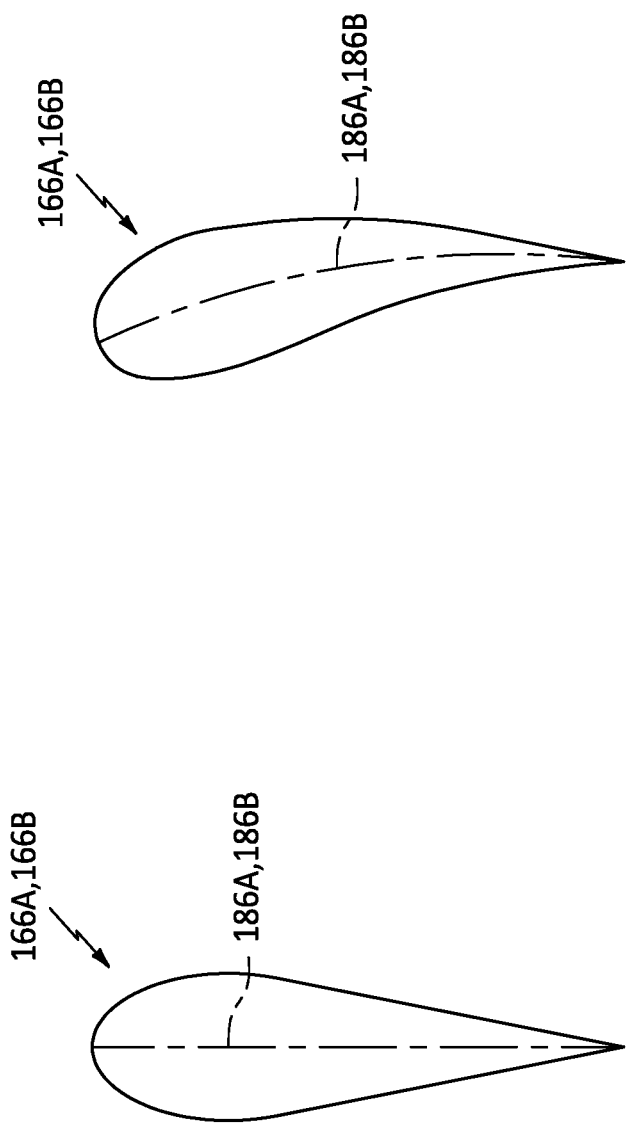

AXIALLY OFFSET VANE ARRAYS IN TURBINE ENGINE BYPASS

GOVERNMENT LICENSE RIGHTS

This invention was made with Government support under Contract DE-AR0001561 awarded by the United States Department of Energy, Office of ARPA-E. The Government has certain rights in the invention.

BACKGROUND OF THE DISCLOSURE

1. Technical Field

This disclosure relates generally to a turbine engine and, more particularly, to vane arrangements within the turbine engine.

2. Background Information

A gas turbine engine includes multiple sets of vanes. The vanes in each set typically extend across a respective flowpath within the gas turbine engine. Some of these vanes may include internal flowpaths for directing fluids such as air across the respective flowpath. Various arrangements of vanes are known in the art. While these known vane arrangements have various benefits, there is still room in the art form improvement.

SUMMARY OF THE DISCLOSURE

According to an aspect of the present disclosure, a turbine engine is provided that includes a fan section, a turbine engine core, a bypass flowpath, a plurality of upstream vanes and a plurality of downstream vanes. The turbine engine core is configured to power the fan section. The turbine engine core includes a core compressor section, a core combustor section and a core turbine section. The bypass flowpath is fluidly coupled with and downstream of the fan section. The bypass flowpath bypasses the turbine engine core. The upstream vanes are arranged circumferentially about an axis in an upstream vane array. Each of the upstream vanes extends radially across the bypass flowpath. The downstream vanes are arranged circumferentially about the axis in a downstream vane array. The downstream vanes are circumferentially interspersed with the upstream vanes. Each of the downstream vanes extends radially across the bypass flowpath. A first of the downstream vanes is axially offset from a first of the upstream vanes along the axis.

According to another aspect of the present disclosure, a turbine engine with an axis is provided that includes a fan section, a turbine engine core, a bypass flowpath, an upstream vane and a downstream vane. The turbine engine core is configured to power the fan section. The turbine engine core includes a core compressor section, a core combustor section and a core turbine section. The bypass flowpath is fluidly coupled with and downstream of the fan section. The bypass flowpath bypasses the turbine engine core. The upstream vane extends radially across the bypass flowpath. The downstream vane extends radially across the bypass flowpath and axially overlaps the upstream vane along the axis such that a leading edge of the downstream vane is axially aligned with or downstream of a location of maximum lateral thickness of the upstream vane.

According to still another aspect of the present disclosure, another turbine engine with an axis is provided that includes a fan section, a turbine engine core, a bypass flowpath, an upstream vane, a downstream vane and a core flowpath. The turbine engine core is configured to power the fan section. The turbine engine core includes a core compressor section, a core combustor section and a core turbine section. The bypass flowpath is fluidly coupled with and downstream of the fan section. The bypass flowpath bypasses the turbine engine core. The upstream vane extends radially across the bypass flowpath. The upstream vane includes an upstream vane internal passage. The downstream vane extends radially across the bypass flowpath and is axially offset from the upstream vane along the axis. The downstream vane includes a downstream vane internal passage. The core flowpath extends through the core compressor section, the core combustor section, the core turbine section, the upstream vane internal passage and the downstream vane internal passage between an inlet into the core flowpath and an exhaust from the core flowpath.

The turbine engine may also include a core flowpath extending through the core compressor section, the core combustor section, the core turbine section and in parallel through an upstream vane internal passage in the upstream vane and a downstream vane internal passage in the downstream vane.

The turbine engine may also include a first heat exchanger module and a second heat exchanger module. The first heat exchanger module may be fluidly coupled with or may include an upstream vane internal passage through the upstream vane. The second heat exchanger module may be fluidly coupled with or may include a downstream vane internal passage through the downstream vane.

The first of the downstream vanes may circumferentially neighbor the first of the upstream vanes within the bypass flowpath.

A location of a maximum lateral thickness of the first of the downstream vanes may be axially offset from a location of a maximum lateral thickness of the first of the upstream vanes along the axis.

A leading edge of the first of the downstream vanes may be axially offset from a leading edge of the first of the upstream vanes along the axis.

A leading edge of the first of the downstream vanes may be downstream of a location of a maximum lateral thickness of the first of the upstream vanes along the bypass flowpath.

A location of a maximum lateral thickness of the first of the downstream vanes may be aligned with or downstream of a trailing edge of the first of the upstream vanes along the bypass flowpath.

A location of a maximum lateral thickness of the first of the downstream vanes may be upstream of a trailing edge of the first of the upstream vanes along the bypass flowpath.

The upstream vane array may have a first throat area. The downstream vane array may have a second throat area. A minimum flow area through a section of the bypass flowpath including the upstream vane array and the downstream vane array may be greater than ninety-five percent of the first throat area or the second throat area.

The first of the downstream vanes may axially overlap more than two-thirds of an axial length of the first of the upstream vanes along the axis.

The first of the downstream vanes may axially overlap between one-third and two-thirds of an axial length of the first of the upstream vanes along the axis.

The first of the downstream vanes may axially overlap less than one-third of an axial length of the first of the upstream vanes along the axis.

Each of the upstream vanes and each of the downstream vanes may include a respective duct which extends radially across the bypass flowpath.

The turbine engine may also include a core flowpath extending through the core compressor section, the core combustor section, the core turbine section and at least one of an upstream vane internal passage in the first of the plurality of upstream vanes or a downstream vane internal passage in the first of the plurality of downstream vanes between an inlet into the core flowpath and an exhaust from the core flowpath.

The upstream vane internal passage and the downstream vane internal passage may be fluidly coupled in parallel along the core flowpath.

The turbine engine may also include a first heat exchanger module and/or a second heat exchanger module. The core flowpath may extend through the first heat exchanger module downstream of the upstream vane internal passage. The core flowpath may extend through the second heat exchanger module downstream of the downstream vane internal passage.

The turbine engine may also include a first heat exchanger module and/or a second heat exchanger module. The first heat exchanger module may be fluidly coupled with or may include an upstream vane internal passage through the first of the upstream vanes. The second heat exchanger module may be fluidly coupled with or may include a downstream vane internal passage through the first of the downstream vanes.

The first of the downstream vanes may have a downstream vane diffusion angle. The first of the upstream vanes may have an upstream vane diffusion angle that is different than the downstream vane diffusion angle.

The first of the downstream vanes may have a downstream vane diffusion angle. The first of the upstream vanes may have an upstream vane diffusion angle that is equal to the downstream vane diffusion angle.

The first of the downstream vanes may be configured as a downstream guide vane. In addition or alternatively, the first of the upstream vanes may be configured as an upstream guide vane.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 9A and 9B are illustrations depicting various vane geometries.

DETAILED DESCRIPTION

Figure 1:
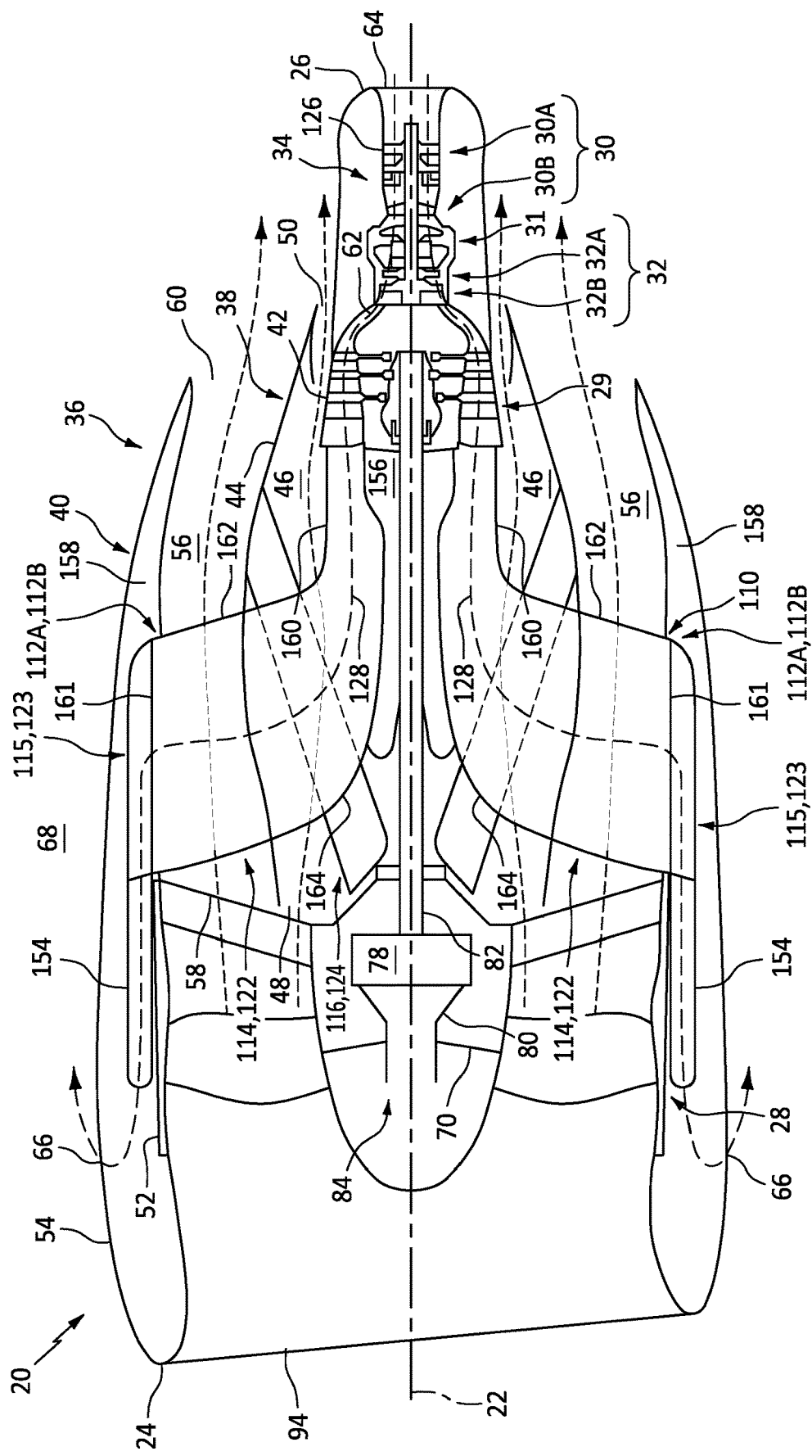
FIG. 1 is a side sectional illustration of a gas turbine engine.

FIG. 1 is a side sectional illustration of a gas turbine engine 20 for an aircraft propulsion system. This turbine engine 20 extends axially along a centerline axis 22 between a forward, upstream end 24 of the turbine engine 20 and an aft, downstream end 26 of the turbine engine 20. The turbine engine 20 includes a fan section 28, a power turbine (PT) section 29 and a turbine engine core 34; e.g., gas generator. The engine core 34 includes a core compressor section 30, a core combustor section 31 and a core turbine section 32. The core compressor section 30 of FIG. 1 includes a low pressure compressor (LPC) section 30A and a high pressure compressor (HPC) section 30B. The core turbine section 32 of FIG. 1 includes a high pressure turbine (HPT) section 32A and a low pressure turbine (LPT) section 32B.

The fan section 28, the PT section 29 and the engine core 34 are arranged sequentially along the axis 22 within an engine housing 36. This engine housing 36 includes a housing inner structure 38 and a housing outer structure 40.

The inner structure 38 includes an inner case 42 and an inner nacelle 44. The inner case 42 houses any one or more or all of the engine sections 29-32B. The inner nacelle 44 houses and provides an aerodynamic cover over at least the inner case 42. The inner nacelle 44 of FIG. 1 also forms an outer peripheral boundary of an inner bypass flowpath 46 radially within the inner structure 38. This inner bypass flowpath 46 extends longitudinally (e.g., generally axially) within the inner structure 38 from an inlet 48 into the inner bypass flowpath 46 to an exhaust 50 out from the inner bypass flowpath 46. The inner bypass inlet 48 is fluidly coupled with and arranged downstream of the fan section 28, for example axially adjacent the fan section 28. The inner bypass exhaust 50 is arranged axially aft, downstream of the inner bypass inlet 48, for example radially outboard of and/or axially aligned with the LPT section 32B.

The outer structure 40 includes an outer case 52 and an outer nacelle 54. The outer case 52 houses at least the fan section 28. The outer nacelle 54 houses and provides an aerodynamic cover over at least the outer case 52. The outer nacelle 54 of FIG. 1 is also disposed radially outboard of, extends circumferentially about (e.g., circumscribes) and extends axially along (e.g., overlaps) at least a forward portion of the inner nacelle 44. With this arrangement, the inner structure 38 and its inner nacelle 44 and the outer structure 40 and its outer nacelle 54 form an outer bypass flowpath 56 within the engine housing 36. This outer bypass flowpath 56 is disposed radially outboard of, extends circumferentially about (e.g., circumscribes) and extends axially along (e.g., overlaps) at least a forward portion of the inner bypass flowpath 46. The outer bypass flowpath 56 extends longitudinally (e.g., generally axially) within the engine housing 36 (e.g., radially between the inner structure 38 and the outer structure 40) from an inlet 58 into the outer bypass flowpath 56 to an exhaust 60 out from the outer bypass flowpath 56. The outer bypass inlet 58 is fluidly coupled with and arranged downstream of the fan section 28, for example axially adjacent the fan section 28. The outer bypass inlet 58 is also radially outboard of and/or axially aligned with the inner bypass inlet 48. The outer bypass exhaust 60 is arranged axially aft, downstream of the outer bypass inlet 58, for example radially outboard of and/or axially aligned with (or proximate) the PT section 29. The outer bypass exhaust 60 may also be disposed axially forward of and/or radially outboard of the inner bypass exhaust 50.

A core flowpath 62 extends sequentially through the LPC section 30A, the HPC section 30B, the combustor section 31, the HPT section 32A, the LPT section 32B and the PT section 29 from an inlet 64 into the core flowpath 62 to an exhaust 66 out from the core flowpath 62. The core inlet 64 of FIG. 1 is disposed at (e.g., on, adjacent or proximate) the engine downstream end 26. This core inlet 64 is formed by the inner structure 38. The core exhaust 66 of FIG. 1 is disposed axially forward of the core inlet 64. The core exhaust 66 of FIG. 1, for example, is disposed radially outboard of the outer bypass flowpath 56, and the core exhaust 66 may be axially aligned with or forward of the fan section 28. This core exhaust 66 is formed by the outer structure 40. The core exhaust 66 may be adjacent and fluidly coupled with an environment 68 external to (e.g., outside of) the turbine engine 20. However, it is contemplated the core exhaust 66 may alternative be adjacent and fluidly coupled with the outer bypass flowpath 56.

Figure 2:
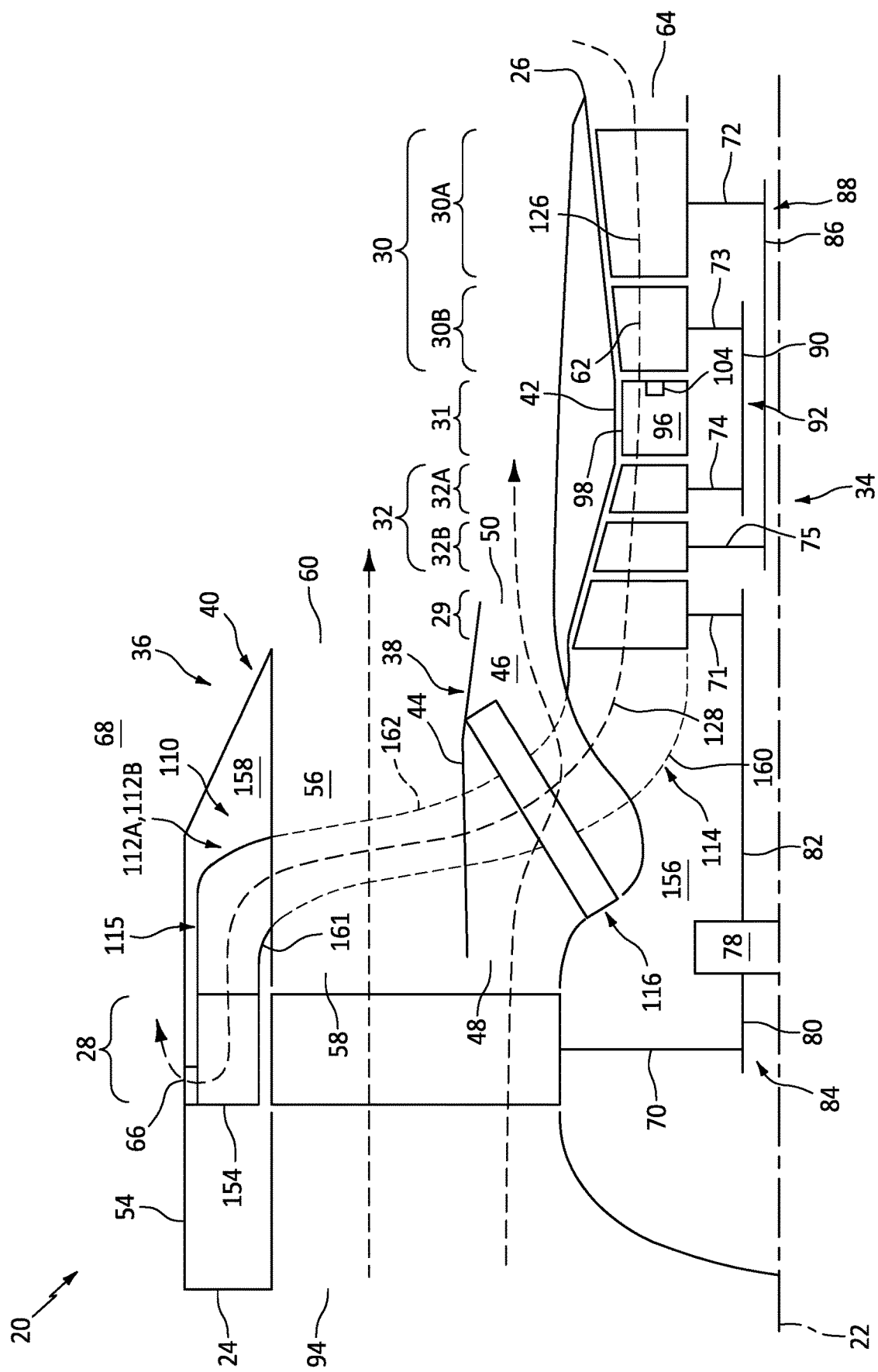
FIG. 2 is a partial schematic illustration of the turbine engine.

Referring to FIG. 2, the engine core 34 may be configured as a reverse flow engine core. The core flowpath 62 of FIG. 2, for example, extends through any one or more or all of the engine sections 30A-32B and 29 in an axially forward direction. Similarly, the turbine engine 20 is configured to move through the external environment 68 in the axially forward direction; e.g., during forward aircraft flight. By contrast, each bypass flowpath 46, 56 extends axially within the turbine engine 20 and its engine housing 36 in an axially aft direction that is opposite the axially forward direction. With such an arrangement, the engine sections 30A-32B, 29 and 28 may be arranged sequentially along the axis 22 between the engine downstream end 26 and the engine upstream end 24.

Each of the engine sections 28, 29, 30A, 30B, 32A and 32B of FIG. 2 includes a respective bladed rotor 70-75. Each of these bladed rotors 70-75 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 70 is connected to a geartrain 78 through a fan shaft 80. The geartrain 78 is connected to the PT rotor 71 through a power turbine (PT) shaft 82. At least (or only) the fan rotor 70, the fan shaft 80, the geartrain 78, the PT shaft 82 and the PT rotor 71 collectively form a fan rotating structure 84. This fan rotating structure 84 of FIG. 2 is configured as a geared rotating structure where, for example, the PT rotor 71 rotates at a different (e.g., faster) speed than the fan rotor 70. However, it is contemplated the fan rotating structure 84 may alternatively be a direct drive rotating structure where, for example, the fan shaft 80 and the geartrain 78 are omitted and the PT shaft 82 directly connects the fan rotor 70 and the PT rotor 71 together. Referring again to FIG. 2, the LPC rotor 72 is connected to the LPT rotor 75 through a low speed shaft 86. At least (or only) the LPC rotor 72, the low speed shaft 86 and the LPT rotor 75 collectively form a low speed rotating structure 88 of the engine core 34. The HPC rotor 73 is connected to the HPT rotor 74 through a high speed shaft 90. At least (or only) the HPC rotor 73, the high speed shaft 90 and the HPT rotor 74 collectively form a high speed rotating structure 92 of the engine core 34. Each of the engine rotating structures 84, 88, 92 may be rotatable about the axis 22; e.g., a rotational axis. These engine rotating structures 84, 88, 92 may be rotatably connected to and supported by the engine housing 36 and its inner structure 38 through a plurality of bearings.

During operation, air enters the turbine engine 20 and its engine core 34 at the engine downstream end 26 through the core inlet 64. This air directed into the core flowpath 62 may be referred to as "core air". Air also enters the turbine engine 20 at the engine upstream end 24 through a forward engine inlet 94. This air is directed through the fan section 28 and into the inner bypass flowpath 46 and into the outer bypass flowpath 56; e.g., in parallel. The air within the outer bypass flowpath 56 may be referred to as "bypass air". The air within the inner bypass flowpath 46 may be referred to as "cooling air".

The core air is compressed by the LPC rotor 72 and the HPC rotor 73 and directed into a combustion chamber 96 of a combustor 98 (e.g., an annular combustor) in the combustor section 31. Fuel is injected into the combustion chamber 96 and mixed with the compressed core air to provide a fuel-air mixture. This fuel-air mixture is ignited and combustion products thereof flow through and sequentially cause the HPT rotor 74, the LPT rotor 75 and the PT rotor 71 to rotate. The rotation of the HPT rotor 74 and the LPT rotor 75 respectively drive rotation of the HPC rotor 73 and the LPC rotor 72 and, thus, compression of the air received from the core inlet 64. The rotation of the PT rotor 71 (e.g., independently) drives rotation of the fan rotor 70. The rotation of the fan rotor 70 propels the bypass air through and out of the outer bypass flowpath 56 and propels the cooling air through and out of the inner bypass flowpath 46. The propulsion of the bypass air may account for a majority of thrust generated by the turbine engine 20.

Figure 3:
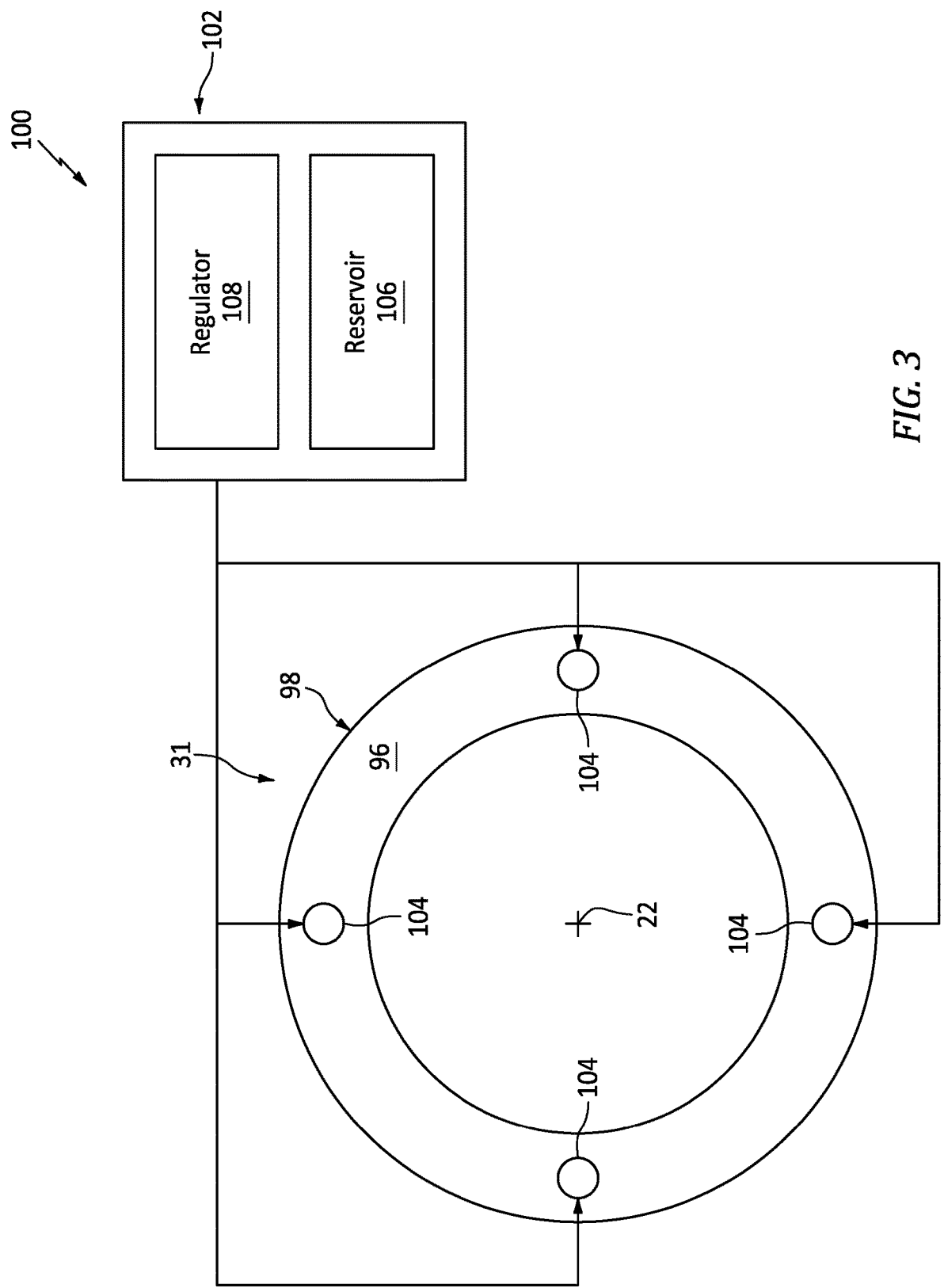
FIG. 3 is a schematic illustration of a fuel system for the turbine engine.

Referring to FIG. 3, the turbine engine 20 includes a fuel system 100 for delivering the fuel to the combustor 98. This fuel system 100 includes a fuel source 102 and one or more fuel injectors 104; see also FIG. 2. The fuel source 102 of FIG. 3 includes a fuel reservoir 106 and/or a fuel flow regulator 108; e.g., a valve. The fuel reservoir 106 is configured to store the fuel before, during and/or after turbine engine operation. The fuel reservoir 106, for example, may be configured as or otherwise include a tank, a cylinder, a pressure vessel, a bladder or any other type of fuel storage container. The fuel flow regulator 108 is configured to direct and/or meter a flow of the fuel from the fuel reservoir 106 to the fuel injectors 104. The fuel injectors 104 may be arranged circumferentially about the axis 22 in an array. Each fuel injector 104 is configured to direct the fuel received from the fuel source 102 into the combustion chamber 96 for mixing with the compressed core air to provide the fuel-air mixture.

The turbine engine 20 of FIGS. 1 and 2 may be configured as a non-hydrocarbon turbine engine/a hydrocarbon free turbine engine. The turbine engine 20, for example, may be configured as a hydrogen fueled turbine engine. The fuel injected into the combustion chamber 96 by the fuel injectors 104 (see FIGS. 2 and 3), for example, may be hydrogen ($H_2$) fuel; e.g., $H_2$ gas. The present disclosure, however, is not limited to hydrogen fueled turbine engines nor to non-hydrocarbon turbine engines. The turbine engine 20, for example, may also or alternatively be fueled by another non-hydrocarbon fuel such as, but not limited to, ammonia ($NH_3$). The turbine engine 20 may still also or alternatively be fueled using any other fuel, including hydrocarbon fuels (e.g., kerosene, jet fuel, sustainable aviation fuel (SAF), etc.), which produces combustion products that include water ($H_2O$) vapor.

Figure 4:
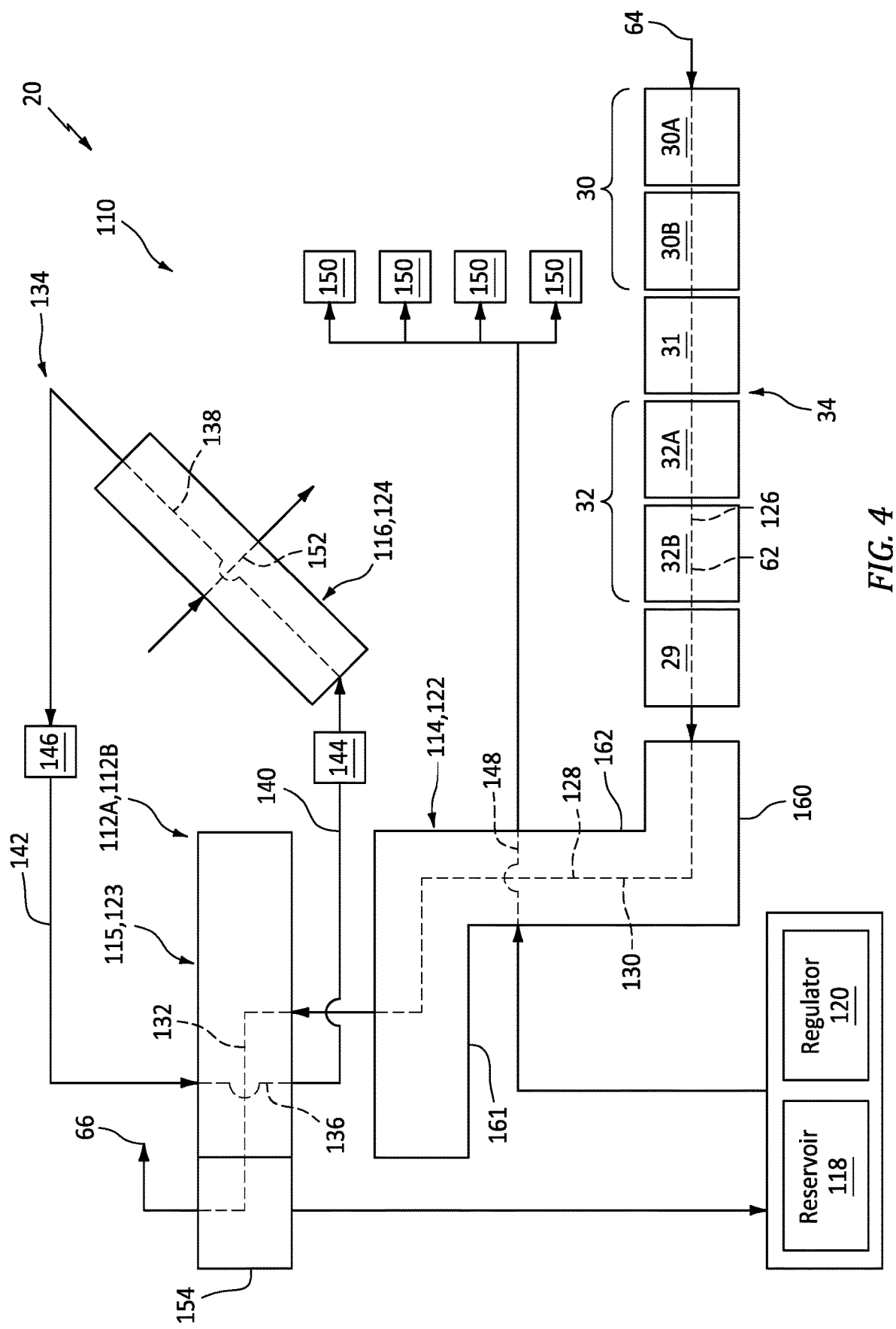
FIG. 4 is a schematic illustration of a water and heat energy recovery system arranged with other components of the turbine engine.
Figure 5:
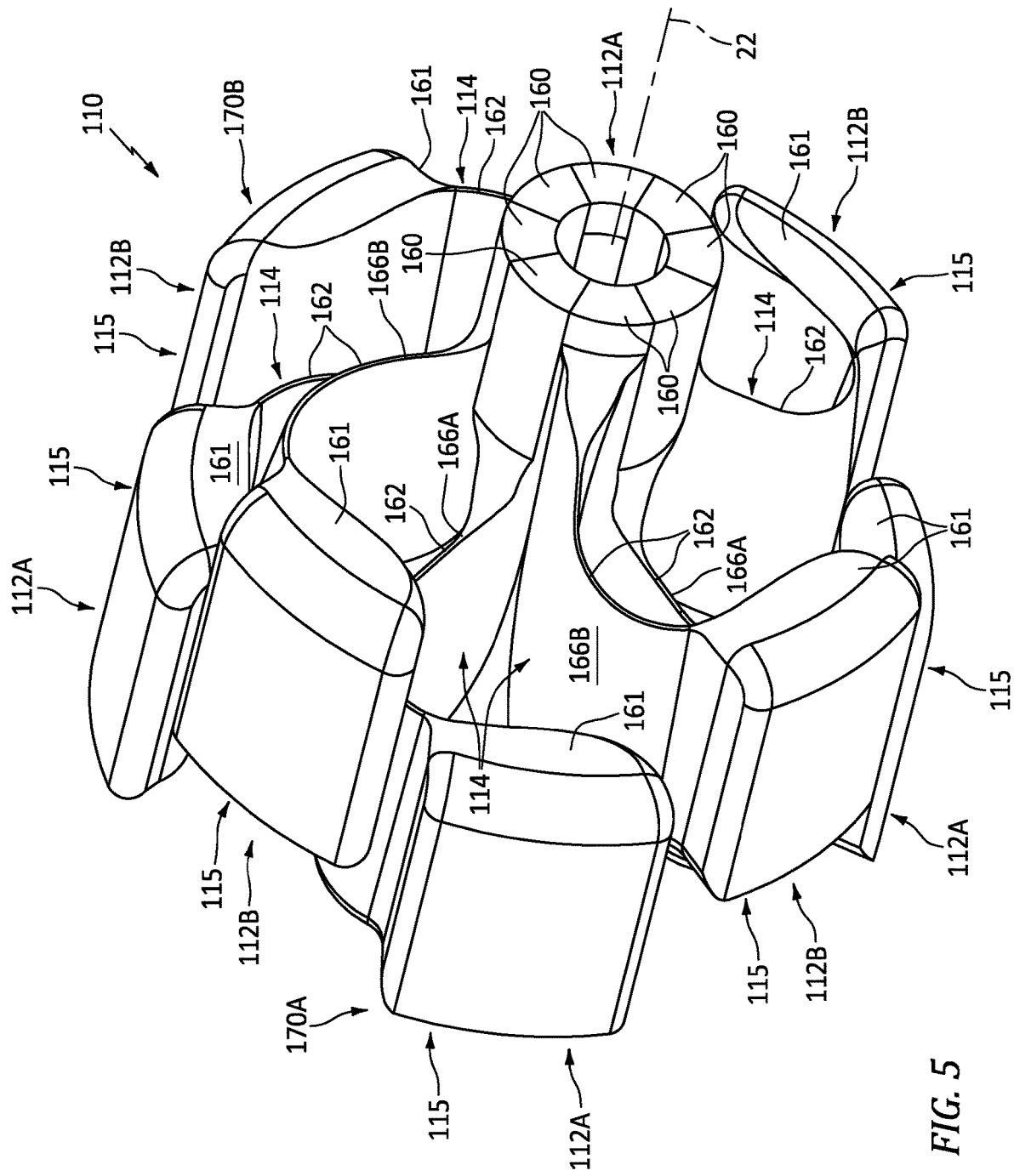
FIG. 5 is a perspective illustration of an evaporator array arranged with a condenser array.

Referring to FIG. 4, the turbine engine 20 may also include a water and heat energy recovery system 110. This recovery system 110 is configured to recover at least some of the water vapor produced by the combustion of the fuel-air mixture within the combustion chamber 96 (see FIG. 2). The recovery system 110 is also configured to evaporate the recovered water using heat energy recuperated from the combustion products to provide steam for use in the engine core 34; e.g., in the combustor section 31. The recovery system 110 of FIG. 4, for example, includes one or more heat exchange (HX) systems 112A, 112B (generally referred to as "112") (one shown in FIG. 4 for ease of illustration). Referring to FIG. 5, the HX systems 112 are distributed circumferentially about the axis 22 in one or more arrays; e.g., circular arrays. Each HX system 112 of FIG. 4 includes a (e.g., arcuate) water evaporator module 114 and a (e.g., arcuate) water condenser module 115. The recovery system 110 may also include a (e.g., annular or arcuate) refrigerant condenser module 116, a water reservoir 118 and/or a system flow regulator 120; e.g., a pump and/or a valve.

The water evaporator module 114 includes a water evaporator 122. The water condenser module 115 includes a water condenser 123. The refrigerant condenser module 116 includes a refrigerant condenser 124. Each heat exchanger 122, 123, 124 may form an entirety of the respective heat exchanger module 114, 115, 116. Alternatively, one or more or all of the heat exchangers 122-124 may each form a select section of the respective heat exchanger module 114-116, or that heat exchanger 122, 123, 124 may be divided into a plurality of heat exchange units which form a plurality of discrete sections of the heat exchanger module 114, 115, 116. Where the heat exchanger 122, 123, 124 forms one or more sections of the respective heat exchanger module 114, 115, 116, one or more other sections of the respective heat exchange module 114, 115, 116 may be formed by duct(s). Of course, each heat exchanger 122, 123, 124 and its section(s) (where applicable) may also be disposed in (or include) a respective duct of the respective heat exchange module 114, 115, 116. For ease of description, the heat exchange module 114, 115, 116 may generally be described below as being completely or substantially formed by the respective heat exchanger 122, 123, 124.

The water evaporator module 114 and the water condenser module 115 are fluidly coupled inline with the core flowpath 62. For example, the core flowpath 62 of FIG. 1 includes a (e.g., annular) base leg 126 and a plurality of (e.g., non-annular, parallel) heat exchange (HX) legs 128. The base leg 126 of FIG. 4 extends sequentially through the LPC section 30A, the HPC section 30B, the combustor section 31, the HPT section 32A, the LPT section 32B and the PT section 29 from the core inlet 64 to an intersection with the HX legs 128 at a downstream end of the PT section 29. Each HX leg 128 is associated with a respective HX system 112 (see also FIG. 1). Each HX leg 128 of FIG. 4 branches off (e.g., in parallel) from the base leg 126 at the intersection and extends from the PT section 29, sequentially through a gas (e.g., combustion products) flowpath 130 of the water evaporator module 114 and its water evaporator 122 and a gas (e.g., combustion products) flowpath 132 of the water condenser module 115 and its water condenser 123, to the core exhaust 66. Briefly, the core exhaust 66 may be formed by a common outlet for all of the HX legs 128. Alternatively, the core exhaust 66 may be formed by a plurality of discrete outlets, where each outlet may be fluidly coupled with a respective single one of the HX legs 128 (or a respective sub-set of the HX legs 128).

Each water condenser module 115 and the refrigerant condenser module 116 are configured together in a refrigerant flow circuit 134. For example, a working fluid (e.g., refrigerant) flowpath 136 of each water condenser module 115 and its water condenser 123 and a working fluid (e.g., refrigerant) flowpath 138 of the refrigerant condenser module 116 and its refrigerant condenser 124 are fluidly coupled in a loop by a respective working fluid first passage 140 and a respective working fluid second passage 142. The first passage 140 may direct a working fluid (e.g., refrigerant or another coolant) from the respective water condenser module 115 and its fluid flowpath 136 to the refrigerant condenser module 116 and its fluid flowpath 138. The second passage 142 may direct the working fluid from the refrigerant condenser module 116 and its fluid flowpath 138 to the respective water condenser module 115 and its fluid flowpath 136. This refrigerant flow circuit 134 may also include a refrigerant flow regulator 144, 146 (e.g., a compressor, a pump and/or a valve) arranged inline with one or both of the working fluid passages 140, 142 to regulate circulation of the working fluid through each water condenser module 115 and the refrigerant condenser module 116.

The water reservoir 118 is configured to hold water before, during and/or after turbine engine operation. The water reservoir 118, for example, may be configured as or otherwise include a tank, a cylinder, a pressure vessel, a bladder or any other type of water storage container. The water reservoir 118 of FIG. 4 is fluidly coupled with and between the respective water condenser gas flowpath 132 and a water flowpath 148 of the respective water evaporator module 114 and its water evaporator 122. The system flow regulator 120 is arranged with the water reservoir 118, and configured to direct and/or meter a flow of the water from the water reservoir 118 to one or more other components 150 of the turbine engine 20. One or more of the turbine engine components 150 may each be configured as or otherwise include a steam injector. Each steam injector may be configured to inject the steam into the combustion chamber 96 (see FIG. 2). One or more of the turbine engine components 150 may also or alternatively be configured as an outlet for introducing the steam for cooling the combustor 98; e.g., a combustor wall, etc. The present disclosure, however, is not limited to the foregoing exemplary turbine engine components 150 which utilize the steam. In particular, various other uses for steam in a turbine engine are known in the art, and the present disclosure is not limited to any particular one thereof.

During operation of the recovery system 110, relatively cool cooling air is directed into an air flowpath 152 of the refrigerant condenser module 116 and its refrigerant condenser 124. The working fluid is directed into the refrigerant condenser fluid flowpath 138. The refrigerant condenser module 116 and its refrigerant condenser 124 exchange heat energy between the cooling air flowing within the refrigerant condenser air flowpath 152 and the working fluid flowing within the refrigerant condenser fluid flowpath 138. The working fluid flowing within the refrigerant condenser fluid flowpath 138 is typically warmer than the cooling air flowing within the refrigerant condenser air flowpath 152. The refrigerant condenser module 116 and its refrigerant condenser 124 are thereby operable to cool the working fluid using the cooling air. This cooling air is received through the inner bypass flowpath 46 (see FIGS. 1 and 2).

For each HX system 112, the cooled working fluid is directed into the water condenser fluid flowpath 136. The relatively hot combustion products, including the water vapor, are directed into the water condenser gas flowpath 132. The water condenser module 115 and its water condenser 123 exchange heat energy between the working fluid flowing within the water condenser fluid flowpath 136 and the combustion products flowing within the water condenser gas flowpath 132. The combustion products flowing within the water condenser gas flowpath 132 are typically warmer than the working fluid flowing within the water condenser fluid flowpath 136. The water condenser module 115 and its water condenser 123 are thereby operable to cool the combustion products using the working fluid. This cooling of the combustion products may condense at least some of the water vapor (e.g., the gaseous water) flowing within the water condenser gas flowpath 132 into liquid water droplets. At least some or all of the liquid water may be collected and separated from the remaining gaseous combustion products by a water separator 154 and subsequently directed to the water reservoir 118 for (e.g., temporary) storage. Here, the water separator 154 is configured as or otherwise includes a gutter integrated into (or connected downstream of) the water condenser module 115. However, various other types of separators are known in the art, and the present disclosure is not limited to any particular ones thereof.

The system flow regulator 120 directs the water from the water reservoir 118 into and through the water evaporator water flowpath 148. The relatively hot combustion products are further directed through the water evaporator gas flowpath 130, for example, prior to flowing through the water condenser gas flowpath 132. The water evaporator module 114 and its water evaporator 122 exchange heat energy between the water flowing within the water evaporator water flowpath 148 and the combustion products flowing within the water evaporator gas flowpath 130. The combustion products flowing within the water evaporator gas flowpath 130 are typically warmer than the liquid water flowing within the water evaporator water flowpath 148. The water evaporator module 114 and its water evaporator 122 are thereby operable to heat the water using the combustion products and thereby recuperate the heat energy from the combustion products. This heating of the water may evaporate at least some or all of the liquid water flowing within the water evaporator water flowpath 148 into gaseous water-steam. At least some of this steam is directed to the turbine engine components 150 for use in the engine core 34; e.g., use in the combustor section 31.

Referring to FIGS. 1 and 2, each water evaporator module 114 may be configured to extend radially across the inner bypass flowpath 46 and the outer bypass flowpath 56 from an inner cavity 156 (e.g., an annular volume, an arcuate volume, compartment, chamber, etc.) of the inner structure 38 to an outer cavity 158 (e.g., an annular volume, an arcuate volume, compartment, chamber, etc.) of the outer structure 40. Each water evaporator module 114 of FIGS. 1 and 2, for example, includes an inner section 160, an outer section 161 and an intermediate section 162.

The inner section 160 is disposed within the inner cavity 156. This inner section 160 projects axially out (or otherwise away) from a forward, downstream end of the PT section 29 along the axis 22. The inner section 160 may extend circumferentially about the axis 22 between, for example, twenty degrees (20°) and ninety degrees (90°); e.g., between thirty-five degrees (35°) and forty-five degrees (45°). With this arrangement, each water evaporator module 114 and its inner section 160 extend circumferentially about and/or axially along the PT shaft 82. The present disclosure, however, is not limited to such an exemplary range and may be adjusted based on, for example, the number of HX systems 112 arranged about the axis 22. Each bypass flowpath 46, 56 is disposed radially outboard of, extends circumferentially about (e.g., circumscribes) and/or extends axially along (e.g., overlaps) each water evaporator module 114 and its inner section 160. Here, the inner section 160 is housed within the inner structure 38 and its inner nacelle 44.

The outer section 161 may be disposed completely or partially within the outer cavity 158. The outer section 161 of FIG. 1, for example, projects radially into the outer cavity 158 to the respective water condenser module 115 of the same HX system 112. This outer section 161 extends axially along the axis 22 between opposing axial ends of the outer section 161. The outer section 161 extends circumferentially about the axis 22 between, for example, twenty degrees (20°) and ninety degrees (90°); e.g., between thirty-five degrees (35°) and forty-five degrees (45°). With this arrangement, each water evaporator module 114 and its outer section 161 extend circumferentially about (and/or within) and/or axially along the outer bypass flowpath 56. The present disclosure, however, is not limited to such an exemplary range and may be adjusted based on, for example, the number of HX systems 112 arranged about the axis 22.

The intermediate section 162 is fluidly coupled with and between the inner section 160 and the outer section 161. The intermediate section 162, for example, extends radially between and to the inner section 160 and the outer section 161. With this arrangement, each water evaporator module 114 and its intermediate section 162 extend radially across (or at least partially within) the inner bypass flowpath 46 and/or the outer bypass flowpath 56. The intermediate section 162 may also project radially through a port 164 (e.g., an opening, a window, etc.) of the refrigerant condenser module 116 in order to cross the refrigerant condenser module 116.

Figure 6:
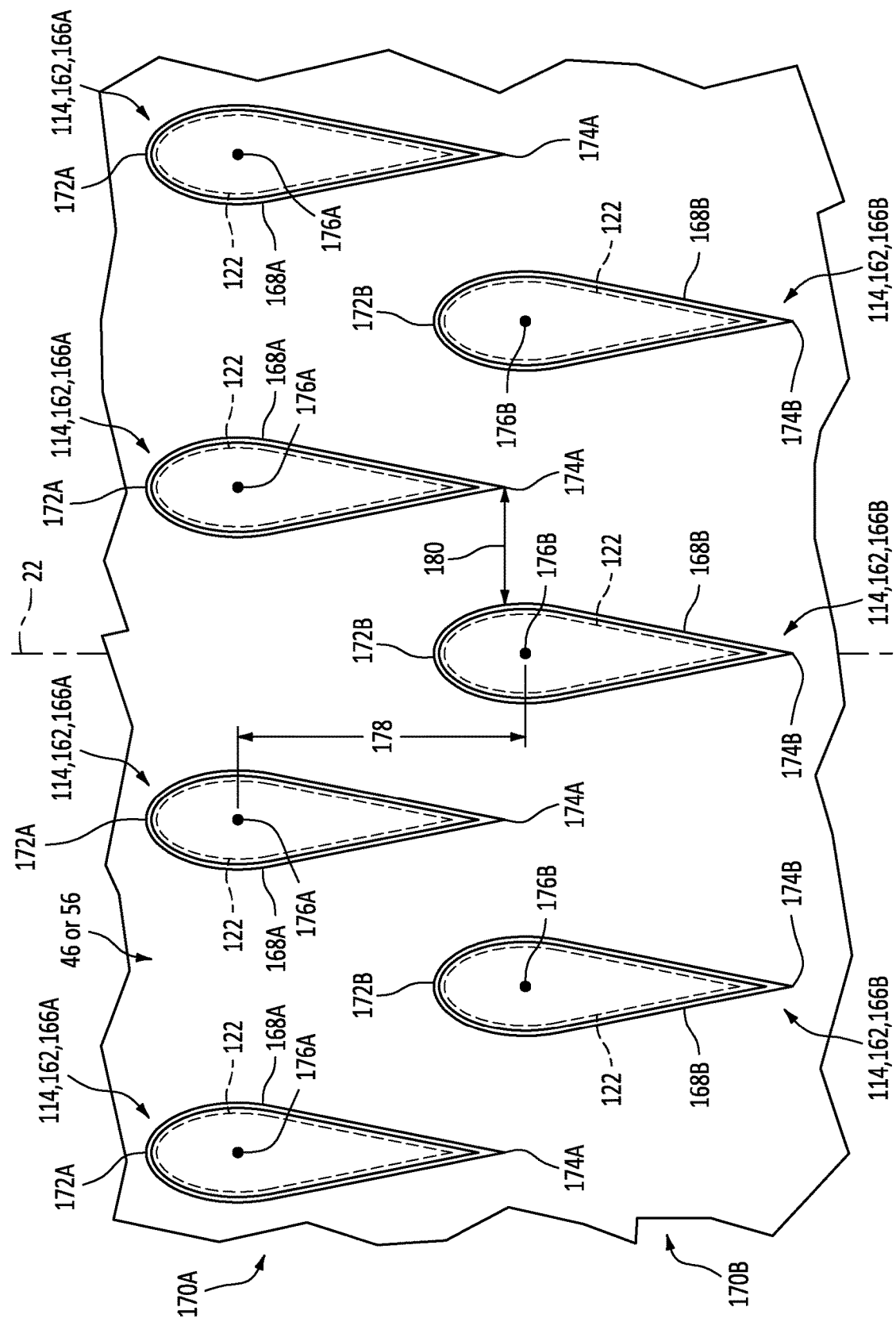
FIG. 6 is a partial plan view illustration of staggered vane arrays within a bypass flowpath.

Referring to FIG. 6, to reduce flow restriction within the inner bypass flowpath 46 and/or the outer bypass flowpath 56 and thereby increase engine efficiency, the water evaporator modules 114 and their intermediate sections 162 are axially staggered along the axis 22. More particularly, vanes 166A and 166B (generally referred to as "166") forming or otherwise housing the respective intermediate sections 162 of the water evaporator modules 114 within the bypass flowpath 46, 56 are axially staggered along the axis 22. Here, each vane 166A, 166B may form a duct 168A, 168B (generally referred to as "168") of the respective intermediate section 162, which duct 168 includes an internal passage forming a respective portion of the HX leg 128. This duct 168 may be empty, or alternatively partially or completely filled with at least a portion of the respective heat exchanger 122.

The vanes 166A and 166B of FIGS. 5 and 6 are distributed into a plurality of vane arrays 170A and 170B (generally referred to as "170"); e.g., circular arrays. The upstream vanes 166A are arranged circumferentially about the axis 22 in/forming the upstream vane array 170A ("upstream array"). The downstream vanes 166B are arranged circumferentially about the axis 22 in/forming the downstream vane array 170B ("downstream array"). The upstream vanes 166A are circumferentially interspersed with the downstream vanes 166B, and the downstream vanes 166B are circumferentially interspersed with the upstream vanes 166A. Each upstream vane 166A of FIGS. 5 and 6, for example, is arranged circumferentially between a circumferentially neighboring (e.g., adjacent) pair of the downstream vanes 166B. Similarly, each downstream vane 166B of FIGS. 5 and 6 is arranged circumferentially between a circumferentially neighboring (e.g., adjacent) pair of the upstream vanes 166A.

The upstream array 170A and its upstream vanes 166A are axially offset along the axis 22 from the downstream array 170B and its downstream vanes 166B within the bypass flowpath 46, 56. However, the upstream array 170A and its upstream vanes 166A may partially axially overlap the downstream array 170B and its downstream vanes 166B. Each downstream vane 166B of FIG. 6, for example, is axially offset (in a downstream direction along the axis 22) from each circumferentially neighboring upstream vane 166A. For example, a leading edge 172B of each downstream vane 166B may be positioned axially downstream of a leading edge 172A of each respective upstream vane 166A. A trailing edge 174B of each downstream vane 166B may also or alternatively be positioned axially downstream of a trailing edge 174A of each respective upstream vane 166A. A maximum (max) thickness location 176B of each downstream vane 166B may also or alternatively be positioned axially downstream of a maximum (max) thickness location 176A of respective upstream vane 166A. Here, the term "max thickness location" may describe a location along a chord line of a vane (and/or along the axis 22) where a lateral thickness of that vane has its a maximum (largest) value. This max thickness location 176A, 176B (generally referred to as "176") may correspond to an axial throat (e.g., choke point) location through the respective vane array 170A, 170B.

By axially offsetting the upstream and the downstream vanes 166A and 166B, a minimum flow area through an axial section (e.g., an annular segment) of the respective bypass flowpath 46, 56 which includes the upstream and the downstream arrays 170A and 170B may be increased. Briefly, the axial section of the respective bypass flowpath 46, 56 may be defined by/may extend axially between the leading edges 172A and the trailing edges 174B. For example, increasing an axial distance 178 between the max thickness locations 176A and 176B of the upstream and the downstream vanes 166A and 166B may increase a (e.g., minimum) lateral inter-vane distance 180 between each circumferentially neighboring pair of the upstream and the downstream vanes 166A and 166B. In other words, a lateral spacing between neighboring vanes 166A and 166B may be opened up by shifting the downstream vanes 166B further axially downstream along the upstream vanes 166A. By axially offsetting the upstream and the downstream vanes 166A and 166B enough along the axis 22, the minimum flow area through the axial section of the respective bypass flowpath 46, 56 may be set by a flow area through the vane array 170A, 170B at the respective max thickness location 176A, 176B-a throat area of the vane array. The axial section of the respective bypass flowpath 46, 56 may thereby include the multiple arrays 170 of the vanes 166 without decreasing (or minimally decreasing depending upon the offset selected) the minimum flow area as compared to if the axial section (e.g., only) included one of the arrays 170 of the vanes 166. However, it is contemplated a slight decrease in the minimum flow area may be acceptable, for example, to provide a more uniform flow area axially through the axial section of the respective bypass flowpath 46, 56. The minimum flow area, however, may still be equal to or greater than ninety percent or ninety-five percent (90-95%) of the throat area of the respective vane array 170A, 170B.

Figures 7A, 7B, 7C:
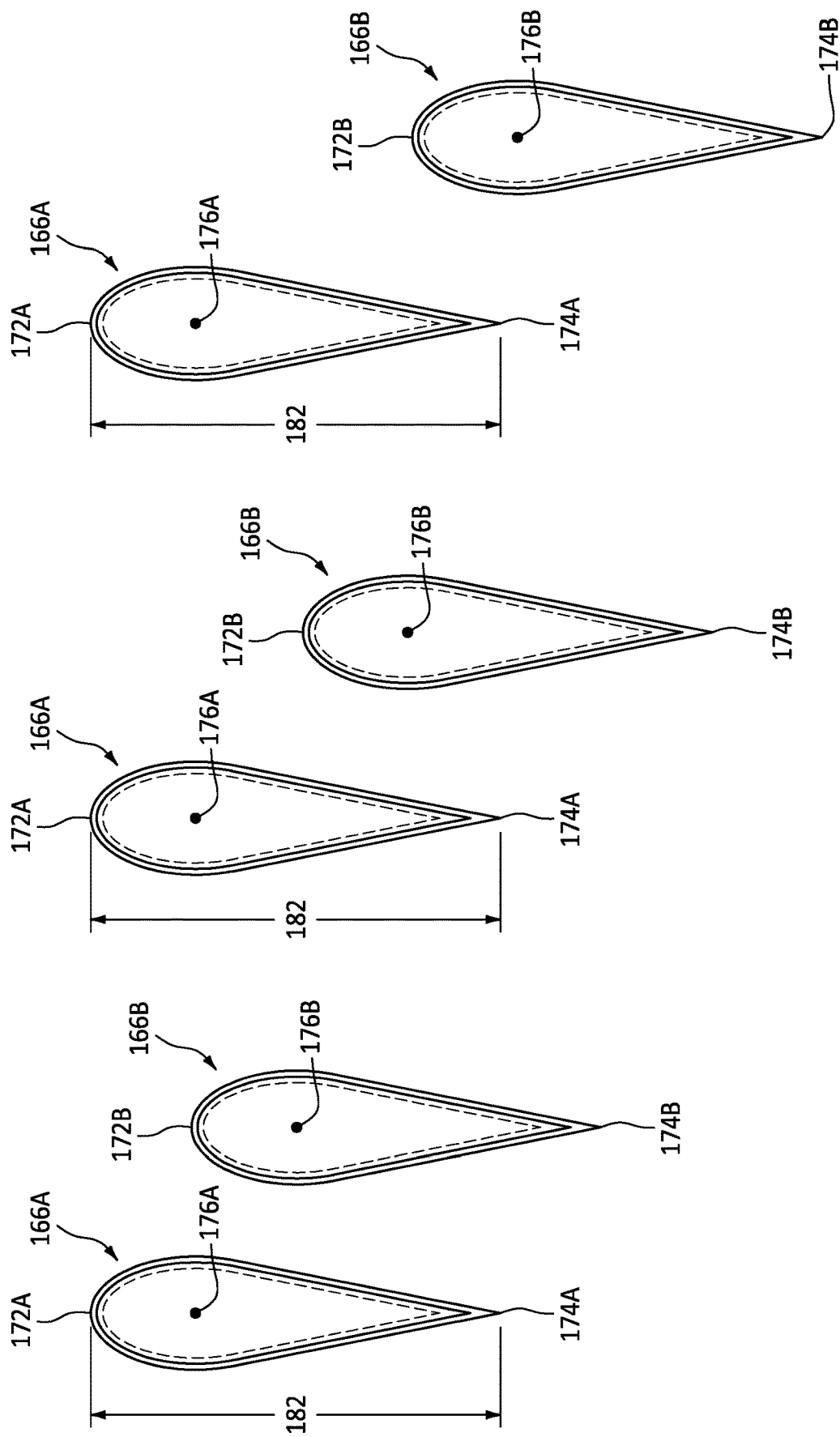
FIGS. 7A-C are illustrations depicting various offsets between an upstream vane and an adjacent downstream vane.

In the arrangement of FIG. 6, the leading edge 172B of each downstream vane 166B is disposed axially downstream of the max thickness location 176A of each respective upstream vane 166A. The max thickness location 176B of each downstream vane 166B is also axially aligned with or downstream of the trailing edge 174A of each respective upstream vane 166A. However, it is contemplated the max thickness location 176B of each downstream vane 166B may alternatively be axially upstream of the trailing edge 174A of each respective upstream vane 166A depending on the specific vane geometry. For example, where a lateral width of a vane is substantially uniform along a majority of its chord line, the axial distance 178 between vanes 166A and 166B may decrease. An amount of overlap between the upstream and the downstream vanes 166A and 166B is therefore tailored based on the geometry (e.g., curvature, aspect ratio, etc.) of the vanes 166A and 166B. In some embodiments, referring to FIG. 7A, each downstream vane 166B may axially overlap more than two-thirds (⅔) of an axial length 182 (e.g., a chord) of each respective upstream vane 166A along the axis 22. In other embodiments, referring to FIG. 7B, each downstream vane 166B may axially overlap between one-third (⅓) and two-thirds (⅔) of the axial length 182 of each respective upstream vane 166A along the axis 22. In still other embodiments, referring to FIG. 7C, each downstream vane 166B may axially overlap less than one-third (⅓) of the axial length 182 of each respective upstream vane 166A along the axis 22. Moreover, in some applications, it is contemplated the downstream array 170B and its downstream vanes 166B may be axially spaced from (e.g., not axially overlap) the upstream array 170A and its upstream vanes 166A along the axis 22.

Referring to FIGS. 1 and 2, each water condenser module 115 may be configured radially outboard of the water evaporator module 114 and its outer section 161 from the same HX system 112. Each water condenser module 115, for example, may be disposed in the outer cavity 158 above the respective water evaporator module 114 and its outer section 161. Each water condenser module 115 projects radially out from a radial outer side of the respective outer section 161. Each water condenser module 115 extends axially along the axis 22 between opposing axial ends of the respective water condenser module 115. Each water condenser module 115 extends circumferentially about the axis 22 between, for example, twenty degrees (20°) and ninety degrees (90°); e.g., between thirty-five degrees (35°) and forty-five degrees (45°). With this arrangement, each water condenser module 115 extends circumferentially about and/or axially along the outer bypass flowpath 56 and/or the respective outer section 161 of the water evaporator module 114. The present disclosure, however, is not limited to such an exemplary range and may be adjusted based on, for example, the number of HX systems 112 arranged about the axis 22. Here, each water condenser module 115 is housed within the outer structure 40.

The core flowpath 62 of FIG. 1 and each of its HX legs 128 extends axially along the axis 22 in a forward direction out of the PT section 29 and into a respective water evaporator module 114 and its inner section 160. The core flowpath 62 and each of its HX legs 128 extends radially through the intermediate section 162 (and the vanes) from the inner section 160 to the outer section 161. The core flowpath 62 and each of its HX legs 128 extends radially out (e.g., in a radial outward direction away from the axis 22) from the respective water evaporator module 114 and its outer section 161 and into a respective water condenser module 115. The core flowpath 62 and each of its HX legs 128 extends axially along the axis 22 in the forward direction out of the respective water condenser module 115 (through the respective water separator 154) and to the core exhaust 66.

In some embodiments, referring to FIG. 4, the refrigerant condenser 124 may be a discrete component from the water condenser 123. However, it is contemplated the refrigerant condenser 124 may alternatively be omitted. In such embodiments, the water condenser 123 may extend into the bypass flowpath 56 (see FIG. 1) and be operable to transfer heat energy between the bypass air and the combustion products for condensing the water vapor out of the combustion products. In addition or alternatively, some of the bypass air may be bled from the bypass flowpath 56 and directed into/through the water condenser 123.

Figure 8A:
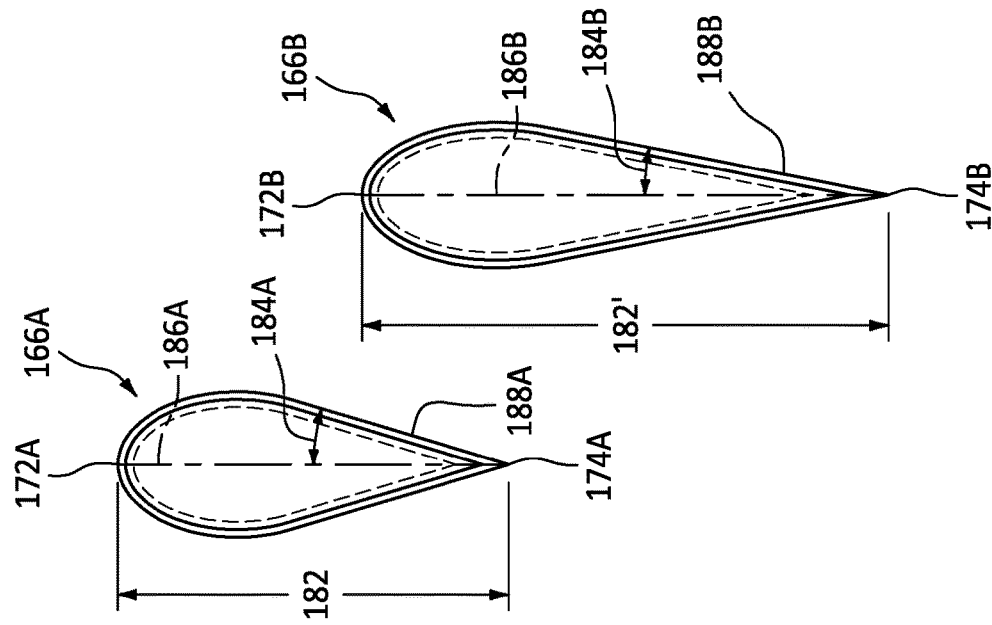
FIGS. 8A and 8B are illustrations depicting various diffusion angles between an upstream vane and an adjacent downstream vane.
Figure 8B:
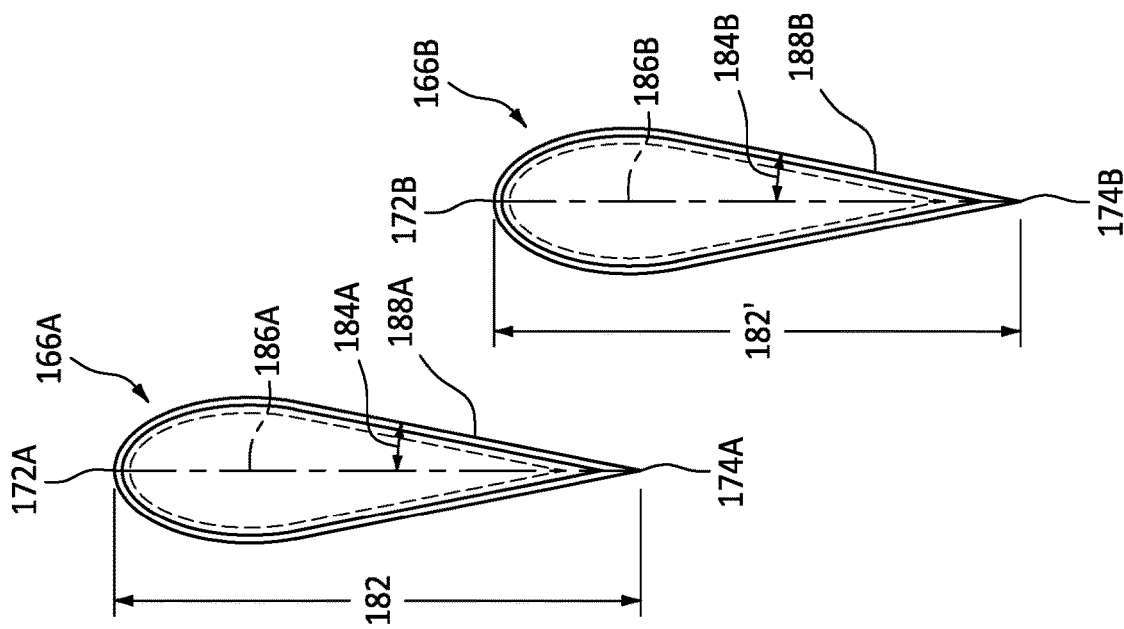

Referring to FIGS. 8A and 8B, each vane 166A, 166B has a diffusion angle 184A, 184B. This diffusion angle 184A, 184B is measured as a maximum angle between a longitudinal centerline 186A, 186B (e.g., a chord line) of the respective vane 166A, 166B and an exterior lateral side 188A, 188B of the respective vane 166A, 166B at the trailing edge 174A, 174B. This diffusion angle 184A, 184B may be less than five degrees (5°), between five degrees (5) and fifteen degrees (15°), or greater than fifteen degrees (15°). In some embodiments, referring to FIG. 8A, the upstream vane diffusion angle 184A may be equal to the downstream vane diffusion angle 184B. In other embodiments, referring to FIG. 8B, the upstream vane diffusion angle 184A may be different (e.g., greater) than the downstream vane diffusion angle 184B. With such an arrangement, the axial length 182 of each respective upstream vane 166A may be different (e.g., shorter) than an axial length 182' of each respective downstream vane 166B.

In some embodiments, referring to FIG. 9A, the longitudinal centerline 186A, 186B of each vane 166A, 166B may follow a straight-line trajectory. In other embodiments, referring to FIG. 9B, the longitudinal centerline 186A, 186B of each vane 166A and/or each vane 166B may follow a curved trajectory; e.g., the respective vane may have camber. In such embodiments, the vanes 166A and/or 166B may be configured as guide vanes (e.g., fan exit guide vanes) to straighten out or otherwise condition an airflow.

In some embodiments, the engine core 34 may be arranged coaxial with the fan rotor 70 and the geartrain 78. The present disclosure, however, is not limited to such an exemplary arrangement. For example, a centerline of the engine core 34 may alternatively be angularly offset from and/or (e.g., radially) displaced from a centerline of the fan rotor 70 and/or a centerline of the geartrain 78.

The turbine engine 20 is generally described above as a turbofan turbine engine. The present disclosure, however, is not limited to such an exemplary turbofan turbine engine configuration. The fan rotor 70, for example, may be configured as another type of propulsor rotor for generating propulsive thrust. Furthermore, the recovery system 110 may be included in a turbine engine configured with a single spool, with a dual spool (e.g., see FIG. 2), or with a more than two spool engine core. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A turbine engine, comprising:
a fan section;
a turbine engine core configured to power the fan section, the turbine engine core including a core compressor section, a core combustor section and a core turbine section;
a bypass flowpath fluidly coupled with and downstream of the fan section, the bypass flowpath bypassing the turbine engine core;
a plurality of upstream vanes arranged circumferentially about an axis in an upstream vane array, each of the plurality of upstream vanes extending radially across the bypass flowpath, and a trailing edge of a first of the plurality of upstream vanes extending axially towards the fan section as the trailing edge of the first of the plurality of upstream vanes extends radially outward away from the axis;
a plurality of downstream vanes arranged circumferentially about the axis in a downstream vane array, the plurality of downstream vanes circumferentially interspersed with the plurality of upstream vanes, each of the plurality of downstream vanes extending radially across the bypass flowpath, a first of the plurality of downstream vanes axially offset from the first of the plurality of upstream vanes along the axis, and a trailing edge of the first of the plurality of downstream vanes extending axially towards the fan section as the trailing edge of the first of the plurality of downstream vanes extends radially outward away from the axis;
a first heat exchanger module including an upstream vane internal passage extending through the first of the plurality of upstream vanes;
a second heat exchanger module including a downstream vane internal passage extending through the first of the plurality of downstream vanes; and
a core flowpath extending sequentially through the core compressor section, the core combustor section, the core turbine section and at least one of the upstream vane internal passage or the downstream vane internal passage from an inlet into the core flowpath to an exhaust from the core flowpath.

2. The turbine engine of claim 1, wherein the first of the plurality of downstream vanes circumferentially neighbors the first of the plurality of upstream vanes within the bypass flowpath.

3. The turbine engine of claim 1, wherein a location of a maximum lateral thickness of the first of the plurality of downstream vanes is axially offset from a location of a maximum lateral thickness of the first of the plurality of upstream vanes along the axis.

4. The turbine engine of claim 1, wherein a leading edge of the first of the plurality of downstream vanes is axially offset from a leading edge of the first of the plurality of upstream vanes along the axis.

5. The turbine engine of claim 1, wherein a leading edge of the first of the plurality of downstream vanes is downstream of a location of a maximum lateral thickness of the first of the plurality of upstream vanes along the bypass flowpath.

6. The turbine engine of claim 5, wherein a location of a maximum lateral thickness of the first of the plurality of downstream vanes is aligned with or downstream of the trailing edge of the first of the plurality of upstream vanes along the bypass flowpath.

7. The turbine engine of claim 5, wherein a location of a maximum lateral thickness of the first of the plurality of downstream vanes is upstream of the trailing edge of the first of the plurality of upstream vanes along the bypass flowpath.

8. The turbine engine of claim 1, wherein
the upstream vane array has a first throat area;
the downstream vane array has a second throat area; and
a minimum flow area through a section of the bypass flowpath including the upstream vane array and the downstream vane array is greater than ninety-five percent of the first throat area or the second throat area.

9. The turbine engine of claim 1, wherein the first of the plurality of downstream vanes axially overlaps more than two-thirds of an axial length of the first of the plurality of upstream vanes along the axis.

10. The turbine engine of claim 1, wherein the first of the plurality of downstream vanes axially overlaps between one-third and two-thirds of an axial length of the first of the plurality of upstream vanes along the axis.

11. The turbine engine of claim 1, wherein the first of the plurality of downstream vanes axially overlaps less than one-third of an axial length of the first of the plurality of upstream vanes along the axis.

12. The turbine engine of claim 1, wherein each of the plurality of upstream vanes and each of the plurality of downstream vanes comprises a respective duct which extends radially across the bypass flowpath.

13. The turbine engine of claim 1, wherein at least one of
the first of the plurality of downstream vanes is configured as a downstream guide vane; or
the first of the plurality of upstream vanes is configured as an upstream guide vane.

14. A turbine engine, comprising:
a fan section;
a turbine engine core configured to power the fan section, the turbine engine core including a core compressor section, a core combustor section and a core turbine section;
a bypass flowpath fluidly coupled with and downstream of the fan section, the bypass flowpath bypassing the turbine engine core;
a plurality of upstream vanes arranged circumferentially about an axis in an upstream vane array, each of the plurality of upstream vanes extending radially across the bypass flowpath;
a plurality of downstream vanes arranged circumferentially about the axis in a downstream vane array, the plurality of downstream vanes circumferentially interspersed with the plurality of upstream vanes, each of the plurality of downstream vanes extending radially across the bypass flowpath, and a first of the plurality of downstream vanes axially offset from a first of the plurality of upstream vanes along the axis;
a core flowpath extending sequentially through the core compressor section, the core combustor section, the core turbine section and at least one of an upstream vane internal passage in the first of the plurality of upstream vanes or a downstream vane internal passage in the first of the plurality of downstream vanes from an inlet into the core flowpath to an exhaust from the core flowpath; and
at least one of a first heat exchanger module, a first portion of the core flowpath extending through the first heat exchanger module, and the first portion of the core flowpath located downstream of the upstream vane internal passage along the core flowpath between the inlet into the core flowpath and the exhaust from the core flowpath; or
a second heat exchanger module, a second portion of the core flowpath extending through the second heat exchanger module, and the second portion of the core flowpath located downstream of the downstream vane internal passage along the core flowpath between the inlet into the core flowpath and the exhaust from the core flowpath.

15. The turbine engine of claim 14, wherein the upstream vane internal passage and the downstream vane internal passage are fluidly coupled in parallel along the core flowpath.

16. A turbine engine, comprising:
a fan section;
a turbine engine core configured to power the fan section, the turbine engine core including a core compressor section, a core combustor section and a core turbine section;
a bypass flowpath fluidly coupled with and downstream of the fan section, the bypass flowpath bypassing the turbine engine core;
a plurality of upstream vanes arranged circumferentially about an axis in an upstream vane array, each of the plurality of upstream vanes extending radially across the bypass flowpath; and
a plurality of downstream vanes arranged circumferentially about the axis in a downstream vane array, the plurality of downstream vanes circumferentially interspersed with the plurality of upstream vanes, each of the plurality of downstream vanes extending radially across the bypass flowpath, and a first of the plurality of downstream vanes axially offset from a first of the plurality of upstream vanes along the axis;
the first of the plurality of downstream vanes having a downstream vane leading edge, a downstream vane trailing edge, a downstream vane longitudinal centerline, a downstream vane exterior lateral side and a downstream vane diffusion angle measured between the downstream vane longitudinal centerline and the downstream vane exterior lateral side at the downstream vane trailing edge, and the first of the plurality of downstream vanes extending longitudinally along the downstream vane longitudinal centerline from the downstream vane leading edge to the downstream vane first trailing edge; and
the first of the plurality of upstream vanes having an upstream vane leading edge, an upstream vane trailing edge, an upstream vane longitudinal centerline, an upstream vane exterior lateral side and an upstream vane diffusion angle that is different than the downstream vane diffusion angle, the upstream vane diffusion angle measured between the upstream vane longitudinal centerline and the upstream vane exterior lateral side at the upstream vane trailing edge, and the first of the plurality of upstream vanes extending longitudinally along the upstream vane longitudinal centerline from the upstream vane leading edge to the upstream vane first trailing edge.

* * * * *